United States Patent
Urban et al.

(10) Patent No.: US 8,043,034 B2
(45) Date of Patent: Oct. 25, 2011

(54) DEVICE FOR THE MANUFACTURE OF DRILLED HOLES, CUT-OUTS, PLANE SURFACES, OR SIMILAR

(75) Inventors: Markus Urban, Jork (DE); Hamid Ebrahimi, Scharnebeck (DE); Harald Schueler, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 848 days.

(21) Appl. No.: 11/916,393

(22) PCT Filed: Jun. 6, 2006

(86) PCT No.: PCT/EP2006/005380
§ 371 (c)(1),
(2), (4) Date: Apr. 10, 2008

(87) PCT Pub. No.: WO2006/131311
PCT Pub. Date: Dec. 14, 2006

(65) Prior Publication Data
US 2008/0219785 A1   Sep. 11, 2008

(30) Foreign Application Priority Data
Jun. 7, 2005   (DE) .......................... 10 2005 026 012

(51) Int. Cl.
*B23B 45/14*   (2006.01)
(52) U.S. Cl. ................. 408/76; 408/67; 408/61; 408/97
(58) Field of Classification Search .................... 408/61, 408/67, 76, 97, 110, 115 R
See application file for complete search history.

(56) References Cited

U.S. PATENT DOCUMENTS

| | | | |
|---|---|---|---|
| 983,083 A * | 1/1911 | Pealing ........................... | 408/76 |
| 2,910,895 A | 11/1959 | Winslow | |
| 4,182,588 A * | 1/1980 | Burkart et al. .................. | 408/14 |
| 5,033,917 A * | 7/1991 | McGlasson et al. ........... | 408/67 |
| 5,213,454 A * | 5/1993 | Givler et al. .................... | 408/61 |
| 5,468,099 A * | 11/1995 | Wheetley et al. ............. | 408/1 R |
| 5,890,848 A * | 4/1999 | Kachich ........................ | 408/1 R |
| 6,200,075 B1 * | 3/2001 | Gaskin et al. ................... | 408/67 |
| 6,296,426 B1 | 10/2001 | King et al. | |
| 6,413,022 B1 | 7/2002 | Sarh | |

(Continued)

FOREIGN PATENT DOCUMENTS

DE   2238838   2/1974

(Continued)

OTHER PUBLICATIONS

German Office Action Dec. 14, 2005, German application No. 10 2005 026 012.8-14, 4 pages.

(Continued)

*Primary Examiner* — Daniel Howell
(74) *Attorney, Agent, or Firm* — Christopher Paradies; Fowler White Boggs P.A.

(57) ABSTRACT

A device for the manufacture of drilled holes, cut-outs, plane surfaces or the like, includes an attachment structure, which is designed for the attachment of the device to at least one component to be machined, a feed device, which is designed to track a drill of a drilling machine, and a control device for controlling the feed device and a drilling machine. In one example, the feed device includes a support for the drilling machine, which is arranged substantially in the center of a crossbeam.

11 Claims, 2 Drawing Sheets

U.S. PATENT DOCUMENTS 6,472,676 B1 * 10/2002 Douglas et al. .......... 250/559.33
2003/0116331 A1   6/2003 Boyl-Davis et al.

FOREIGN PATENT DOCUMENTS

| DE | 9318014.4 U1 | 3/1994 |
| DE | 20207381 U1 | 9/2002 |
| EP | 1767323 A2 * | 3/2007 |
| GB | 2299772 A * | 10/1996 |
| WO | 01/68302 A1 | 9/2001 |

OTHER PUBLICATIONS

German Office Action dated Jun. 15, 2007, German application No. 10 2005 026 012.8-14, 3 pages.

* cited by examiner

DEVICE FOR THE MANUFACTURE OF DRILLED HOLES, CUT-OUTS, PLANE SURFACES, OR SIMILAR

REFERENCE TO RELATED APPLICATION

This application claims the benefit of the filing date of German Patent Application No. 10 2005 026 012.8 filed Jun. 7, 2005, the disclosures of which application is hereby incorporated herein by reference.

FIELD OF THE INVENTION

The field relates to a device for the manufacture of drilled holes, cut-outs, plane surfaces, or the like.

BACKGROUND OF THE INVENTION

The quality of drilled holes depends on the workman in question, since systems are used that are in part unstable, or the drilled holes are introduced completely freehand.

In some applications, automated drilling machines may be used. However, for various reasons, for example, due to factors such as the accessibility of the drilling location, the weight of the automated drilling machine, as well as on-the-job safety, this solution finds only very limited use.

From DE 2 238 838, a portable drilling and milling device of known art, which is designed for the manufacture of drilled holes, cut-outs, plane surfaces, or the like is disclosed. It includes a feed device, which tracks a drill according to the drilling progress, gearing to drive the drive shaft, an electrical controller for the control of the device, and means for retention and alignment on a plane, concave or convex surface of a component to be machined, and also at least three feet which at their lower ends are provided with suction cups, into which a vacuum may be introduced for attachment to a component to be machined.

However this device may be complicated to handle, so that this may lead to time-consuming manufacture in the production of individual parts.

SUMMARY OF THE INVENTION

Among other things, it may be an object to provide an improved device for the manufacture of drilled holes, cut-outs, plane surfaces, or similar, the handling of which is simplified.

A device for the manufacture of drilled holes, cut-outs, plane surfaces, or the like, in one example, comprises:
- a means of attachment, which is designed for the attachment of the device to at least one component to be machined;
- a feed device, which is designed for the tracking of a drill of a drilling machine; and
- a control device for controlling the feed device and a drilling machine.

In one example, a support for a drilling machine is arranged substantially in the center of a crossbeam. As a result of this the handling may be simplified in a simple manner, since the weight of the device during placement and alignment is supported by the at least one component to be machined. In one example, only after placement and alignment of the device is a drilling machine inserted into the support.

The means of attachment may be an attachment structure such as a crossbeam, for example.

Provision is made that the means of attachment have two attachment elements. This allows the device, in one example, to be embodied compactly and at the same time allows for a secure attachment on both plane and also convex or concave curved surfaces of components to be machined. For this purpose, in one example, the attachment elements are attached such that they may pivot.

In one example, the attachment elements are designed as suction cups, such that by generation of a vacuum, a simple attachment of the device on at least one component to be machined may be allowed.

In a further embodiment, each of the suction cups is connected with a vacuum port by vacuum lines, which run through the crossbeam in an integrated manner. Thus, a compact build ensues, in which the vacuum lines running through the crossbeam may be protected against damage.

In one example, the vacuum cups have seating faces. These seating faces may be designed as "hard points," and lie on the surface of the at least one component to be machined, after the suction cups have been evacuated. Thus, a secure and accurate positioning of the attachment may be achieved, ensuring a precise introduction of a drilled hole.

In an embodiment, the device has a suction device, which is designed for the extraction by suction of drilling swarf. This suction device may ensure that the at least one component is not damaged or contaminated by drilling swarf.

In one example, the suction device is integrated into a pressure stamp sleeve. This pressure stamp sleeve is conical in design, and during the drilling process bears on the at least one component to be machined, so that the suction device sucks drilling swarf out of the interior of the pressure stamp sleeve. Furthermore, by the bearing of the pressure stamp sleeve during the drilling process, the device according to one example may be stabilized and fixed in its position relative to the at least one component to be machined. As a result of the conical design of the pressure stamp sleeve, the flow velocity of the air may be increased and the suction effect may be improved. Moreover, the pressure stamp sleeve has a cut-out, through which a defined volumetric flow of air from the environment may flow into the pressure stamp sleeve when the latter is bearing on the component, and may enable the extraction by suction of the swarf.

In a further embodiment, the device includes a lubrication device for the lubrication of the drill, so that a sufficient supply of lubricant may be guaranteed.

In one example, the lubrication device is integrated into a pressure stamp sleeve. Since the pressure stamp sleeve during the drilling process bears on the at least one component to be machined, the substantially closed interior of the pressure stamp sleeve may ensure a sufficient and effective supply of lubricant.

In a further embodiment, the lubrication device is connected with the controller such that the lubrication device releases lubricant at the start of a drilling process. In one example, just before the start of the drilling process, the drilling device releases lubricant for 0.25 to 0.5 seconds, for example. By this brief release of lubricant, the contamination of the least one component to be machined may be reduced, as is the cleaning effort required after the introduction of the drilled holes.

In an embodiment, the device is designed as a hand-held unit, so that it may be transported without problems to the particular site at which it is to be used. For this purpose, a device may have a weight of less than 1,000 g, in particular, less than 750 g. Furthermore for this purpose, the device may have a maximum of 50 cm in length.

In one example, a device may have a drilling machine accommodated in the support. In one example, one may be dealing with a compressed air drilling machine, or a drilling machine with another form of drive.

BRIEF DESCRIPTION OF THE FIGURES

The device is described below with reference to embodiments illustrated in the enclosed figures. In the drawings.

Identical or similar elements are always identified by the same or corresponding reference characters in all figures. The illustrations in the figures are diagrammatic and not to scale.

DETAILED DESCRIPTION

The examples described and drawings rendered are illustrative and are not to be read as limiting the scope of the invention as it is defined by the appended claims.

Figure 1:
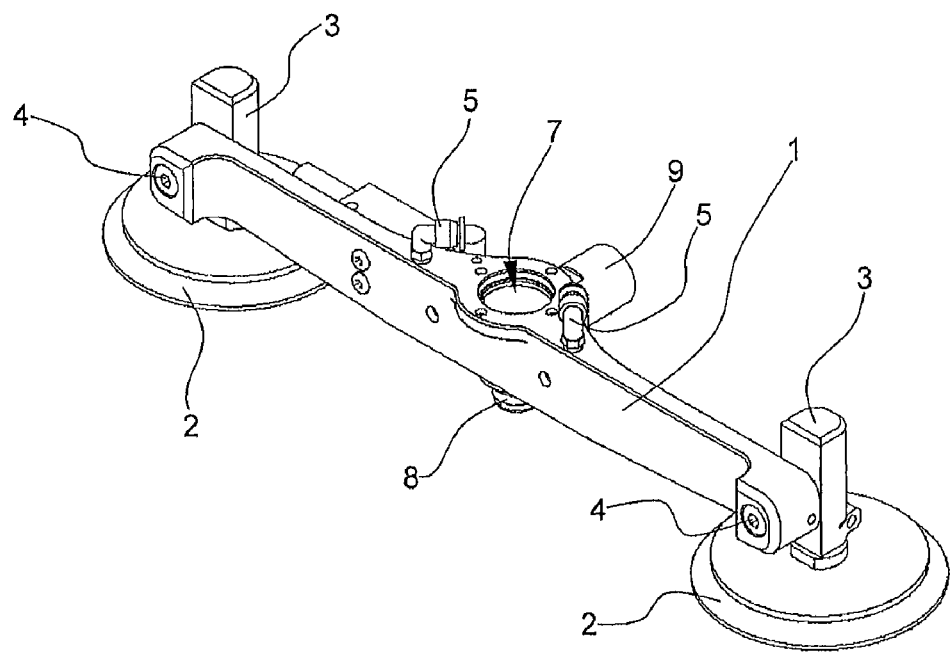
FIG. 1 shows a perspective view of an embodiment of a device according to one example.

As shown in FIG. 1, the device includes amongst other items, a crossbeam 1. The crossbeam may be of approximately 50 cm in length, and may be made of metal, for example, a suitable aluminium or steel alloy. The whole device may have a weight of approximately 700 g.

At the two ends of the crossbeam 1, two suction cups 2 are arranged on attachment elements 3, which may be pivoted, using two joints 4 such that the crossbeam 1 may be placed on a plane component surface, and also on a convex or concave curved component surface.

From the suction cups 2, vacuum lines (not depicted) run through the attachment elements 3 and the crossbeam 1, which open into vacuum ports 5 and via the evacuation of the suction cups 2 allow the crossbeam 1 to be attached to at least one component to be machined.

Figure 2:
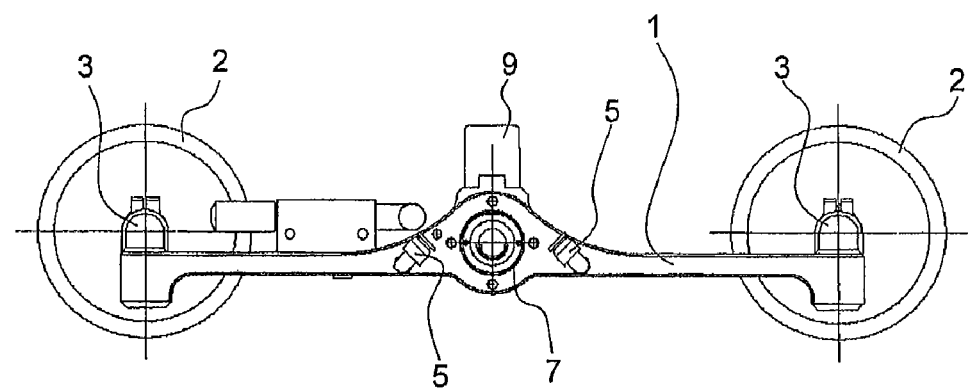
FIG. 2 shows a plan view onto an embodiment according to FIG. 1.
Figure 3:
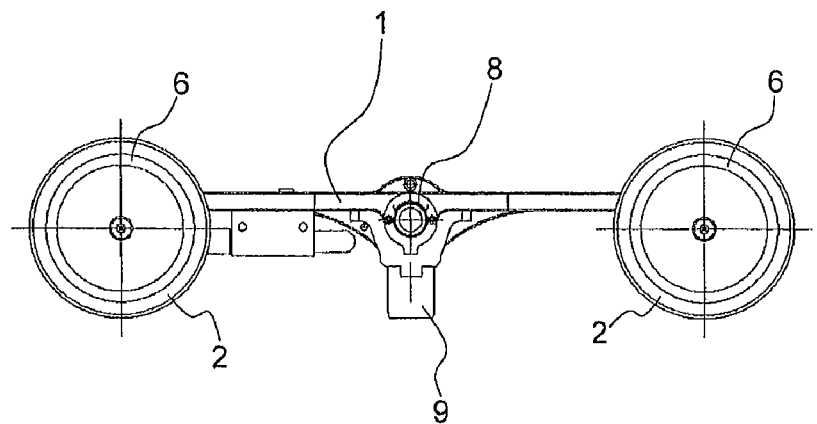
FIG. 3 shows an underside view of an embodiment according to FIG. 1.
Figure 4:
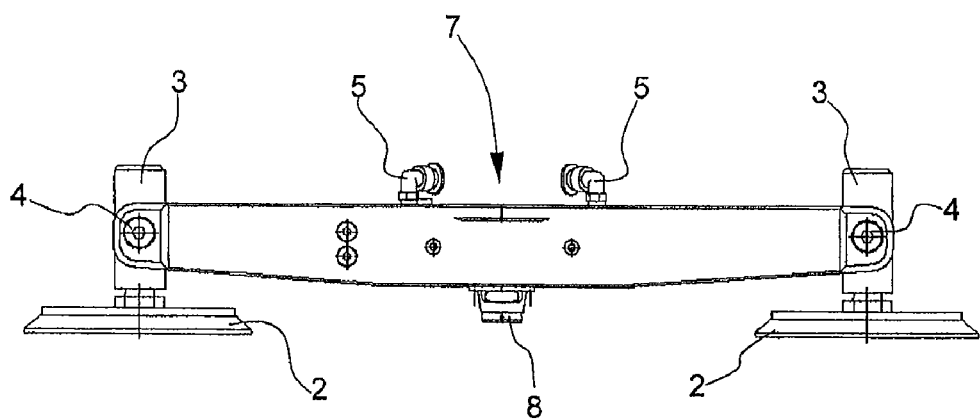
FIG. 4 shows a front view of an embodiment according to FIG. 1.

In the interiors of the suction cups 2 are arranged annular seating faces 6 (shown in FIG. 2) which are designed as "hard points," which bear on the surface of the at least one component to be machined after placement and evacuation, and thus provide stability during the following drilling process. The annular seating faces 6 prevent any tipping of the crossbeam about its longitudinal axis, such that two suction cups may be sufficient for connecting to a workpiece to be machined.

In the center of the crossbeam 1 is arranged a support 7, which is designed for the accommodation of a drilling machine, in particular, a compressed air drilling machine. The support 7 belongs to a feed device, (not depicted) which is designed for tracking a drill of a drilling machine corresponding to the drilling progress during the drilling process, and for this purpose is connected with a control device that is not shown.

Underneath the support 7, a pressure stamp sleeve 8, which is of conical design, in one example is arranged. The pressure stamp sleeve is designed so that it may be lowered, such that before the start of a drilling process, for example, before a drill tip touches the surface, the pressure stamp sleeve bears down onto the surface of the at least one component to be machined and its cylindrically shaped interior surrounds a drill. As a result of the conical design of the pressure stamp sleeve 8, the flow velocity of the suction air is increased. In order to enable extraction by suction of a drilling swarf while the pressure stamp sleeve 8 is bearing on the component to be machined, the sleeve, in one example, has a rectangular-shaped cut-out with a small cross-sectional area, on one side through which the ambient air can flow in.

The pressure stamp sleeve 8 has a port 9 for a suction device, (not depicted) with which the drilling swarf may be extracted by suction. Furthermore, the pressure stamp sleeve 8 is connected with a lubrication device, (not depicted) which supplies lubricant into the interior of the pressure stamp sleeve 8 after the bearing down of the pressure stamp sleeve 8, but before the drill tip touches the surface. In this example, the lubrication device is connected with a control device, not shown, which ensures that lubricant is supplied to the drilling location for a time period of only 0.25 to 0.5 seconds, by a timing element in one example.

First, the crossbeam 1 with the two suction cups 2 is placed onto the at least one component to be machined and aligned with the desired drilling location. Then the two suction cups 2 are evacuated, in order to fix the crossbeam 1, and their position is once again checked. A drilling machine is then inserted into the support 7. The drilling machine may also permanently remain in the support 7, in order to simplify and accelerate handling, which is particularly the case when a large number of drilled holes are to be introduced.

By the control device, in one example, the lubrication device is activated, which supplies lubricant into the interior of the lowered pressure stamp sleeve 8, for a time period of 0.25 to 0.5 seconds, for example.

Then, the feed device is activated by the control device such that the drill lowers and introduces the desired drilled hole.

Then the drilling machine may be removed once again from the support 7 and the crossbeam 1 may be released from the at least one component to be machined after the ventilation of the suction cups 2.

Alternative combinations and variations of the examples provided will become apparent based on this disclosure. It is not possible to provide specific examples for all of the many possible combinations and variations of the embodiments described, but such combinations and variations may be claims that eventually issue.

REFERENCE SYMBOL LIST 1 crossbeam
2 suction cup
3 attachment element
4 joint
5 vacuum port
6 seating face
7 support
8 pressure stamp sleeve
9 port

What is claimed is:

1. A hand-held unit for the manufacture of drilled holes, cut-outs, plane surfaces, or the like in at least one component to be machined by a drilling machine, the unit comprising:
   a feed device designed for tracking of a drill of the drilling machine comprising:
      a support for the drilling machine arranged substantially in the center of a crossbeam having two opposite ends; and
      two suction cups, a first of the two suction cups being pivotably arranged by a first attachment element disposed at a first of the two opposite ends of the crossbeam, and a second of the two suction cups being pivotably arranged on a second attachment element disposed at a second of the two opposite ends of the crossbeam, the suction cups being designed for attachment of the hand-held unit to the at least one component to be machined; and a control device coupled to the feed device such that the feed device and the drilling machine are controlled by the control device;

wherein each of the suction cups are coupled to a vacuum port by vacuum lines which run through the crossbeam in an integrated manner, and the two suction cups are joined adjustably to the crossbeam such that the two suction cups are capable of securing the hand-held unit onto planar, concave and convex surfaces of the at least one component to be machined by pivotable adjustment of the first attachment element disposed at the first of the two opposite ends and the second attachment element disposed at the second of the the two opposite ends of the crossbeam of the feed device.

2. The hand-held unit of claim 1 wherein the suction cups comprise seating faces.

3. The hand-held unit of claim 1 further comprising:
a suction device, which is designed for the extraction by suction of a drilling swarf.

4. The hand-held unit of claim 3,
wherein the suction device is integrated into a pressure stamp sleeve.

5. The hand-held unit of claim 1 further comprising:
a lubrication device for the lubrication of the drill.

6. The hand-held unit of claim 5,
wherein the lubrication device is integrated into a pressure stamp sleeve.

7. The hand-held unit of claim 5, wherein the lubrication device is coupled to the control device such that the lubrication device releases lubricant at the start of a drilling process.

8. The hand-held unit of claim 1, wherein the hand-held unit has a weight of less than 1,000 g.

9. The hand-held unit of claim 8, wherein the hand-held unit is a maximum of 50 cm in length.

10. The hand-held unit of claim 1, further comprising a drilling machine detachably accommodated in the support.

11. The hand-held unit of claim 1, wherein the hand held unit has a weight of less than 750 g.

* * * * *